United States Patent [19]

Dinsdale

[11] 4,107,504

[45] Aug. 15, 1978

[54] METHOD AND APPARATUS FOR CONTROLLING AN ELECTRO-DISCHARGE MACHINE TOOL

[75] Inventor: Raymond Dinsdale, Nelson, England

[73] Assignee: Rolls-Royce Limited, London, England

[21] Appl. No.: 785,250

[22] Filed: Apr. 6, 1977

[30] Foreign Application Priority Data

Apr. 15, 1976 [GB] United Kingdom ............... 15445/76

[51] Int. Cl.$^2$ ............................................... B23P 1/08
[52] U.S. Cl. ............................ 219/69 E; 219/69 G; 219/69 M
[58] Field of Search ................ 219/69 M, 69 C, 69 G, 219/69 E, 69 S, 69 V

[56] References Cited
U.S. PATENT DOCUMENTS

| 2,783,411 | 2/1957 | Matulaitis | 219/69 G |
| 3,995,134 | 11/1976 | Dudden | 219/69 E |
| 4,049,942 | 9/1977 | Balleys et al. | 219/69 M |

*Primary Examiner*—Bruce A. Reynolds
*Attorney, Agent, or Firm*—Cushman, Darby & Cushman

[57] ABSTRACT

A pair of complementary rod electrodes, one of which machines the other, is added to the circuitry of an electro-discharge machining system in which holes are drilled into existing passages in a workpiece, by other machining electrodes. When a machining electrode breaks into the passage, the resulting sharp increase in electrical potential thereacross is prevented from affecting the electrode advance control mechanism because the mechanism only senses the low potential across the continuously machining rod electrodes. Thus the electrode which machines the workpiece is prevented from rapidly traversing the passage and machining the opposite wall.

7 Claims, 2 Drawing Figures

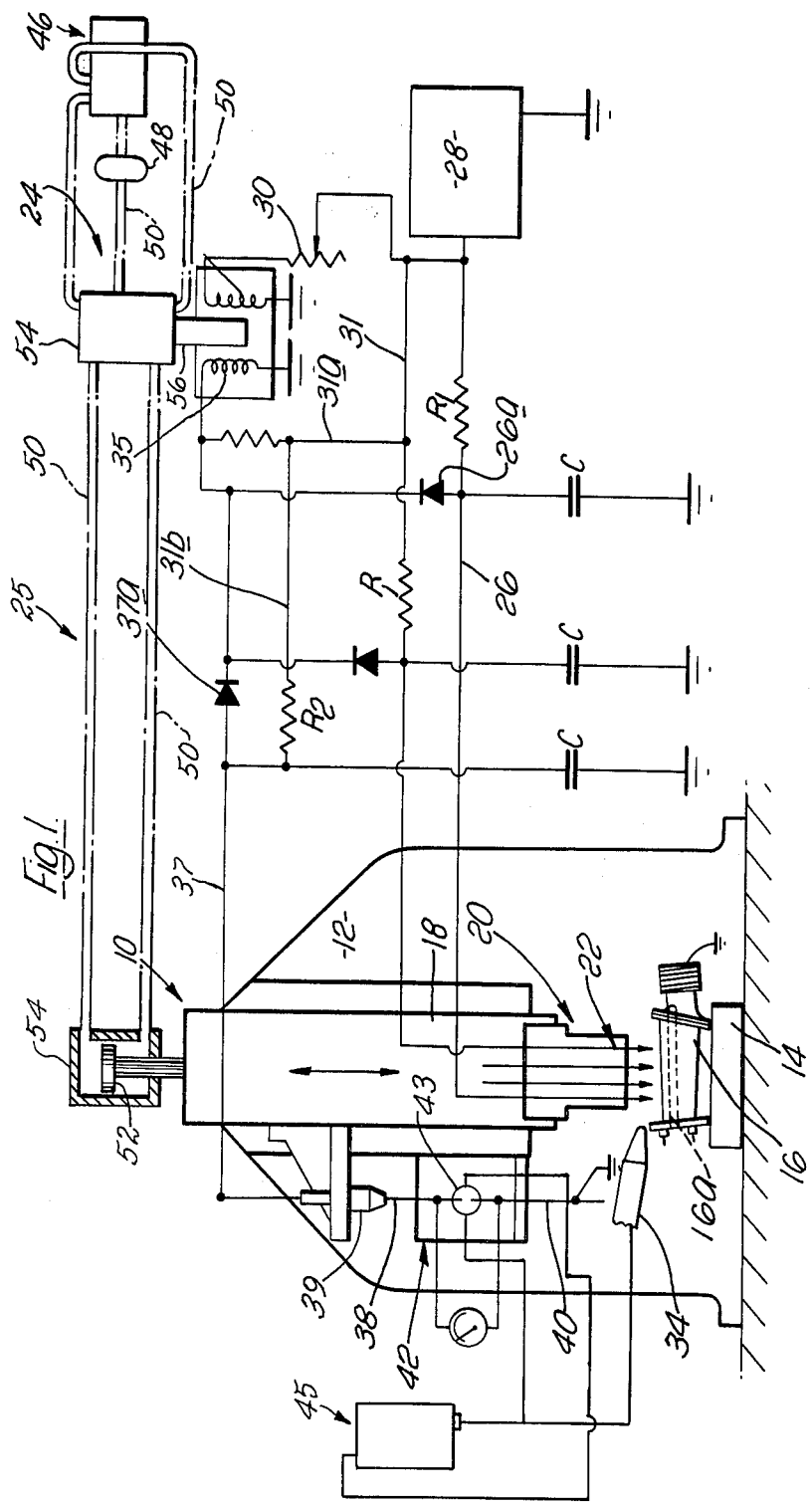

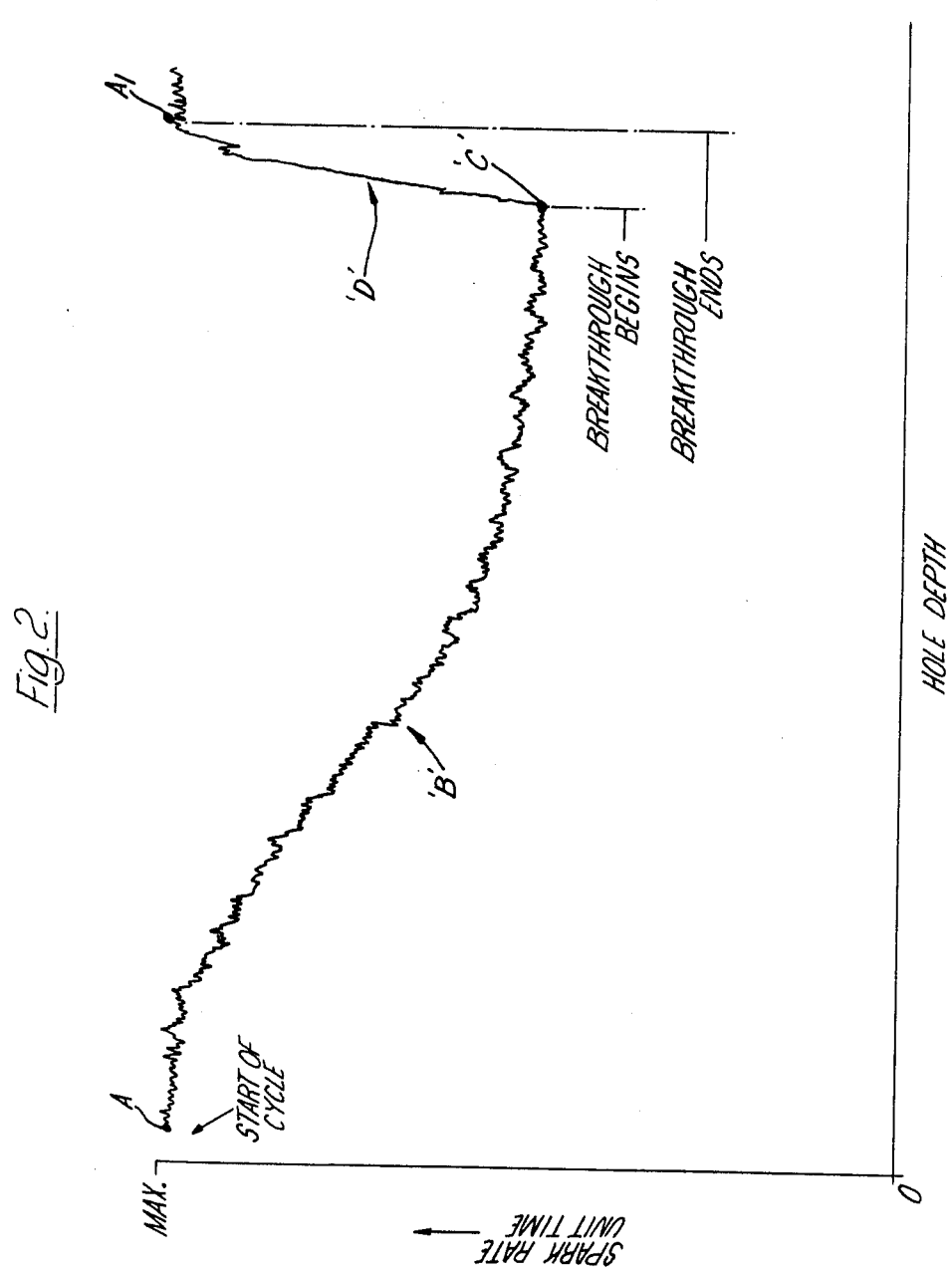

METHOD AND APPARATUS FOR CONTROLLING AN ELECTRO-DISCHARGE MACHINE TOOL

This invention concerns apparatus for use with electro-discharge machine tools.

The magnitude of the gap maintained between a machine tool electrode and a complementary workpiece electrode during an electro-discharge machining operation is determined by the magnitude of electrical potential across the two electrodes. Thus, if the gap is greater than a given norm, the potential rises over and above a corresponding given value due to a rise in resistance created by the increase in gap and, if the gap reduces from the given norm, the potential drops because of the reduction in resistance, with resultant flow of current.

It is known to utilise the potential variation by way of deriving a signal from it and using the signal to actuate the machine tool electrode traversing means, so that on derivation of a signal which e.g. indicates that the gap is too big because the potential is plus, the traversing means is actuated to cause the electrode to move rapidly towards the workpiece until the gap is reduced sufficiently to regain the appropriate potential across it.

The method has a drawback in that sometimes it is desired to drill one hole into another hole at some angle thereto and in that situation, electrode breakthrough creates a potential rise which the machine tool senses and attempts to obviate by accelerating the electrode forward speed to close the gap which of course in the first instance, equals the diameter of the hole being drilled into. However, as the electrode surges forward, a machining action of the electrodes on the side walls of the hole being drilled momentarily increase also, which causes the electrical potential to drop again to something akin to the average required for proper machining conditions, with the result that the breakthrough is, to some extent, masked. Thus it is difficult to observe that breakthrough has actually occurred.

It is known to utilise a micro switch depth gauge which is set relative to the position at which the holes have broken through but even so, because of geometric variations in both workpiece and machinery electrode settings, this can result in machining the back wall of the hole being drilled into, by at least one of the machining electrodes.

It is a particular object of this invention to provide apparatus for controlling the forward traverse speed of a machining electrode in an electro-discharge machining process.

A further object of this invention is to provide means for indicating the achievement of complete traverse of a workpiece thickness, by an electrode of an electro-discharge machine tool.

According to the present invention, electro-discharge machine tool apparatus comprises a pair of complementary rod electrodes adapted for mounting in line on an electro-discharge machine tool for relative reciprocating movement towards and away from each other, a mechanism for causing said relative reciprocating movement of said complementary electrodes and a similar, relative movement between at least one machining electrode and a workpiece electrode, first means electrically connectable to said complementary electrodes and at least one machining electrode and workpiece electrode and second means electrically connectable to a source providing an electrical reference potential, said first means in operation, being adapted to be sensitive to differences in electrical potential across the complementary electrodes relative to the electrical potential across said at least one machining electrode and workpiece electrode and on sensing said differences, to act upon said mechanism to actuate it so as to cause relative movement of respective complementary electrodes towards or away from each other at a rate determined by the difference between the potentials at said first and second means.

The invention further provides visual monitoring means to monitor the potential of the electrical pulse discharges across said complementary electrodes, which discharges are representative of the sparking rate, whereby to make visually observable, rapid spark rate changes of large magnitude which are indicative of breakthrough of the at least one machining electrode, of the workpiece electrode thickness being machined.

The invention will now be described, with reference to the accompanying drawings in which:

FIG. 1 is a diagrammatic view of an electro-discharge machine tool, and

FIG. 2 is a graph showing spark rate changes between the complementary electrodes during a machining operation.

An electro-discharge machine tool is indicated generally by the numeral 10. The machine tool comprises a rigid vertical portion 12 having a table 14 at its lower end for supporting a workpiece 16. Vertical portion 12 also supports a member 18 which is slidable in a vertical direction, relative to vertical portion 12. Member 18 in turn has a cartridge 20 which holds a number of machining electrodes 22, fixed to it for sliding with it during operation of the machine tool. The cartridge could if desired, hold only one electrode without detriment to the invention.

A pair of auxiliary electrodes 38, 40 are positioned to one side of member 18 and electrode 38 is traversable with the member 18 towards and away from electrode 40.

Member 18 and its associated electrodes 22 are advanced towards and retracted from the workpiece electrode 16 by forces exerted thereon via the fluid in a hydraulic system as generally shown at 25. In more detail, the hydraulic system 25 includes a reservoir 46 for hydraulic oil, a pump 48 and hydraulic piping 50 to and from the various elements of the system as is known in the art. The member 18 is provided with a piston 52 in a conventional hydraulic cylinder 54, the fluid force magnitude and direction of movement of the piston 52 being controlled in accordance with the position of a shuttle valve, shown diagrammatically at 24. The shuttle valve 24 includes a housing 54 to which the hydraulic piping 50 extends and a movable valve element or spindle 56, a portion of which extends out of the housing 54 between the windings 32 and 35.

The movement of the valve element 56 of shuttle valve 24 is controlled by windings 32 and 35, the former receiving electrical potential generated signals at a reference servo mechanism 30 which signals actuate the valve to cause advance of the electrodes and the latter receiving signals representing the lowest of the respective varying potentials across the complementary electrodes 38, 40 and machining and workpiece electrodes 22, 16 which signals tend to move the electrodes away from each other. The signals from the complementary electrodes are passed to winding 35 via a line 37 and diode 37a and the signals from the machining and workpiece electrodes are passed to winding 32 via line 26 and diode 26a. Line 26 also passes current to electrodes 22 from supply 28 via a resistor $R_1$ as does line 31 and resistor R. Current is passed to the complementary electrode 38 via lines 31, 31a, 31b resistor $R_2$ and that part of line 37 upstream of diode 37a, having regard to the direction of conductance of diode 37a.

At the start of the machining operation, the electrodes are adjusted so that the complementary electrodes 38 and 40 abut each other and the machining electrodes 22 abut the workpiece 16 functioning as a workpiece electrode, whereafter they are withdrawn a given distance and the machine is then switched on. The complementary electrode 38 operatively carried by the slidable member 18 is adjustably mounted in its mounting structure on the member 18 by a collet jaw 39 or the like whereby its movement may be relatively adjusted to at least one of the machining electrodes 22 for the purpose of initially positioning it in relation to the other complementary electrode 40. At this point, the potential across both lots of electrodes is of a high value and sufficient to activate winding 35 against winding 32 by way of passing more current through winding 35 than through winding 32 so as to adjust shuttle valve 24 such that the forward drive mechanism (not shown) drives the electrodes 22 rapidly towards workpiece 16 and of course, complementary electrode 38 equally rapidly toward complementary electrode 40. In view of the previously described setting procedure, electrodes 38 and 22 will reach their respective complementary electrodes simultaneously and the electrical potential across their respective gaps will attain a previously selected value of equality, which is appropriate for machining of electrode 40 and workpiece 16 functioning as a workpiece electrode to take place. Moreover, the preselected potential value will reduce the current ratio between windings 32, 35 with the result that the valve element or spindle 56 of the shuttle valve 24 will assume a position which reduces the forward traverse speed of the electrodes 38 and 22 to a speed appropriate for the desired rate of machining workpiece 16 and electrode 40.

However, the situation very soon shows a change in that as electrodes 22 bore into workpiece 16, sludge builds up and dielectric penetration falls off, closing the gap between electrode 22 and workpiece 16. This has the effect of reducing the potential across electrode 22 and workpiece 16 relative to that across electrodes 38, 40 and this now lower potential is transmitted to winding 35 by way of reducing current flow therethrough, with the result that the effect of winding 32 on the shuttle 24 i.e. to move it to a position to retract the electrode is damped, thereby further reducing the forward traverse speed of electrodes 22 and 38.

The reduced forward speed of electrode 38 has the added effect of reducing that electrode's ability to machine its complementary electrode 40 at an appropriate rate and therefore creates a build up of potential therebetween and a reduction in spark rate per unit time.

This situation continues with forward traverse speed reducing with increase in hole depth, until such time as breakthrough of electrodes 22 into the space 16a which comprises an elongate passage in workpiece 16. At this point in time there occurs a dramatic reversal of events in that the electrical potential across the electrodes 22 and workpiece 16 increases by a relatively large amount in a very short time interval, as a result of the end of the electrodes 22 being suddenly spaced from the opposing workpiece face by an amount equal to the passage diameter. The potential increase causes a great imbalance between the outputs across the respective machining and complementary electrodes, which results in winding 35 receiving an increased current flow and immediately reacts against winding 32 to cause rapid forward traverse of electrodes 22 by appropriate movement of shuttle 24 in an effort to close the gap and regain the proper potential value. However, it also has the effect of re-adjusting the gap between electrodes 38, 40 thus reducing the potential build up and increasing the spark therebetween and the resulting further change in imbalance is once more sensed by winding 35 in that it loses current flow to electrodes 38, 40. The effect against winding 32 is immediately reduced, so that the shuttle 24 moves to reduce forward traverse speed of the electrodes to that selected at the star of the operation. Thus the speed of traverse of the electrodes 22 across the passage 16a is then controlled entirely by the traverse rate dictated by the potential across complementary electrodes 38, 40.

The advantage which accrues from the invention comprises giving the operator ample time in which to detect by any desired means, breakthrough of the electrodes into passage 16a, that time being dependent upon the desired machining traverse speed of electrodes 22 and the magnitudes of diameter of the passage. Having detected breakthrough, the operator can take steps to prevent machining of the back wall of the passage, by cutting off the electrical supply to the electrode 22 or stopping forward traverse completely.

A further advantage which accrues from using a complementary machining electrode circuit, is that it is possible to visually observe breakthrough of the electrodes 22, by monitoring the spark rate across the complementary electrodes 38 and 40. The actual sparks themselves are not observed for this purpose, but the average potential of the pulses of electricity which are emitted each time sparking occurs.

In FIG. 2 there is shown a graphical readout of spark rate change at the complementary electrodes in relation to the depth of hole being machined. Point 'A' indicates the start of machining of both complementary electrodes 38, 40 and machining electrodes 22. It will be noticed that the spark rate almost immediately starts to fall as electrode machining rate rapidly gets worse on penetration, thus slowing down the forward traverse.

Line 'B' represents the increasing and then decreasing rates of spark rate as the hole deepens until point 'C' is reached where breakthrough of electrodes 22 is achieved with consequent rise in potential between 22 and 16, rapid surge forward of both sets of electrodes and resultant closure of electrodes 38, 40, a rapid fall in potential thereacross and increase 'D' in spark rate at electrodes 38, 40, up to its original value, now '$A_1$'. This increase in spark rate takes place over a very short distance and thus brings the forward traverse speed of electrodes 22 back under control of the complementary electrode unit.

The invention described herein is not restricted to, but nevertheless is ideally suited for use with, that invention described in the co-pending U.S. application Ser. No. 785,247 of Raymond Dinsdale and Sydney Aveyard, assigned to the same assignee, Rolls-Royce Limited, as the present application, in that by using the two in unison, it is possible to first control forward traverse speed of electrodes 22 on breakthrough and then on expiry of a suitable time interval after breakthrough, utilise the invention described in the co-pending U.S. application Ser. No. 785,247 , to disconnect each and every electrode as required, from electrical supply.

The adjacent ends of electrodes 38, 40 are encased in a housing 42 having a chamber 43 therein through which a flow of dielectric fluid from a dielectric fluid supply 45 is passed during operation. The dielectric fluid is tapped from the dielectric fluid supply 45 and is discharged by a nozzle 34 to the machining electrodes 22 and also is sufficient to ensure that the electrodes 38 and 40 opposed ends are immersed in the chamber 43 therein.

I claim:

1. Electro-discharge machine tool apparatus comprising a pair of complementary rod electrodes mounted on an electro-discharge machine tool for relative reciprocating movement towards and away from each other, moving means for causing said relative reciprocating movement of said complementary electrodes and a similar, relative movement between at least one machining electrode and a workpiece electrode, first means electrically connectable to said complementary electrodes and at least one machining electrode and workpiece electrode and second means electrically connectable to a source providing an electrical reference potential, said first means in operation, being sensitive to differences in electrical potential across the complementary electrodes and across said at least one machining electrode and workpiece electrode relative to the electrical potential across said second means and on sensing said differences, to act upon said moving means to actuate it so as to cause relative movement of the complementary electrodes and said machining electrode and said workpiece electrode towards or away from each other at a rate determined by the difference between the potentials at said first and second means.

2. Electro-discharge machine tool apparatus as claimed in claim 1 wherein said moving means for causing reciprocation comprises a shuttle valve connectable to a pressurized hydraulic supply so as to direct hydraulic fluid to either side of a piston so as to move it and which in operation, will cause said relative movement between said complementary electrodes and between said machining electrode and workpiece electrode.

3. Electro-discharge machine tool apparatus as claimed in claim 2 wherein said shuttle valve comprises a housing and a movable valve element and wherein said first and second means each comprise a winding arranged to act on said movable valve element to move it longitudinally of itself on passage of electrical current through the windings, during operation of a machine tool fitted with the apparatus, the direction of movement of the movable valve element being dependent on the difference in magnitude of the windings respective electrical potentials.

4. Electro-discharge machine tool apparatus as claimed in claim 1 wherein one of said complementary electrodes has mounting structure for mounting it on an electro-discharge machine tool so as to be movable with an at least one machining electrode thereon and the other said complementary electrode has mounting structure for fixedly mounting it on a said electro-discharge machine tool, in alignment with the first complementary electrode, such that one can machine the other during operation.

5. Electro-discharge machine tool apparatus as claimed in claim 4 wherein said one complementary electrode is adjustably mounted for movement in its mounting structure, which movement is relative to an at least one machining electrode, for the purpose of initially positioning it in relation to the said other complementary electrode.

6. Electro-discharge machine tool apparatus as claimed in claim 1 and including a chamber wherein in operation, the adjacent ends of the complementary electrodes are contained, said chamber receiving and passing therethrough a flow of dielectric fluid such that said fluid will immerse the electrodes adjacent ends in said chamber.

7. Electro-discharge machine tool apparatus as claimed in claim 6 wherein said chamber receives the dielectric fluid from a dielectric fluid supply of an electro-discharge machine tool to which the apparatus is to be fitted.

* * * * *